US007295617B2

(12) United States Patent
Shimotoyodome

(10) Patent No.: US 7,295,617 B2
(45) Date of Patent: Nov. 13, 2007

(54) ADPCM DECODER

(75) Inventor: Tsutomu Shimotoyodome, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 658 days.

(21) Appl. No.: 10/807,352

(22) Filed: Mar. 24, 2004

(65) Prior Publication Data

US 2004/0258164 A1 Dec. 23, 2004

(30) Foreign Application Priority Data

Jun. 17, 2003 (JP) ............................ 2003-171555

(51) Int. Cl.
*H04B 14/06* (2006.01)
*H04L 25/00* (2006.01)

(52) U.S. Cl. ....................................... 375/245; 375/217

(58) Field of Classification Search ................ 375/242, 375/245, 248, 249, 244; 341/143; 275/242, 275/245, 217

See application file for complete search history.

(56) References Cited

U.S. PATENT DOCUMENTS 5,041,830 A * 8/1991 Abe ............................ 341/77
5,369,791 A * 11/1994 Asghar et al. .............. 455/222
5,657,350 A * 8/1997 Hofmann .................... 375/241

FOREIGN PATENT DOCUMENTS

| | | |
|---|---|---|
| JP | 4324900 | 11/1992 |
| JP | 07-221718 | 8/1995 |
| JP | 08-223126 | 8/1996 |
| JP | 10056388 | 2/1998 |

* cited by examiner

*Primary Examiner*—Tesfaldet Bocure
(74) *Attorney, Agent, or Firm*—Volentine & Whitt, P.L.L.C.

(57) ABSTRACT

A shift register receives a quantization difference signal separated into a mantissa part and an exponent part and bit-develops the mantissa part. A shift arithmetic operation control circuit bit-shifts the bit-developed mantissa part in accordance with a value of the exponent part. An overflow detection bit is added to the MSB of the shift register and detects the overflow of the bit-shifted mantissa part. When the overflow of the mantissa part is detected, a selector replaces the bit-developed mantissa part with a predetermined upper limit value and outputs it as a prediction signal. When the overflow is not detected, the selector outputs the bit-developed mantissa part as a prediction signal. An ADPCM decoder having high audio quality is provided by simple processes and construction.

4 Claims, 11 Drawing Sheets

DECODER OUTPUT WHEN NORMAL DATA HAS BEEN DECODED

DECODER OUTPUT WHEN DATA HAVING ERRORS HAS BEEN DECODED

DECODER OUTPUT IN THE EMBODIMENT 1

| NORMALIZED INPUT RANGE OF QUANTIZER $\log_2|D(k)|-Y(k)$ | $|D(k)|$ | NORMALIZED OUTPUT OF QUANTIZER $\log_2|D(k)|-Y(k)$ |
|---|---|---|
| [ 4.31,+∞ ) | 15 | 4.42 |
| [ 4.12,4.31) | 14 | 4.21 |
| [ 3.91,4.12) | 13 | 4.02 |
| [ 3.70,3.91) | 12 | 3.81 |
| [ 3.47,3.70) | 11 | 3.59 |
| [ 3.22,3.47) | 10 | 3.35 |
| [ 2.85,3.22) | 9 | 3.09 |
| [ 2.64,2.95) | 8 | 2.80 |
| [ 2.32,2.64) | 7 | 2.48 |
| [ 1.95,2.32) | 6 | 2.14 |
| [ 1.54,1.95) | 5 | 1.75 |
| [ 1.08,1.54) | 4 | 1.32 |
| [ 0.52,1.08) | 3 | 0.81 |
| [ -0.13,0.52) | 2 | 0.22 |
| [ -0.96,-0.13) | 1 | -0.52 |
| [ -∞ ,-0.96) | 0 | -∞ |

INPUT/OUTPUT CHARACTERISTICS OF THE ADAPTIVE QUANTIZER

ADPCM DECODER

BACKGROUND OF THE INVENTION

1. Field of the Invention

The invention relates to a ADPCM (Adaptive Differential Pulse Code Modulation) decoder which conforms with the ITU-T Recommendation G.726.

2. Related Background Arts

A communication system which conforms with the ITU-T Recommendation G.726 ADPCM has been spread as a compression system of an audio signal. According to an error correction system of a transmission error in the communication system, a transmitter inserts a check bit into a transmission frame and transmits the resultant transmission frame. A system such that when a receiver receives the transmission frame, it extracts the check bit and discriminates the presence or absence of the transmission error in a transmission system. When the receiver detects the transmission error, it corrects the transmission frame on the basis of a predetermined error correction system and inputs the error-corrected transmission frame to a decoder (for example, refer to the abstract of JP-A-7-221718), a system such that when the receiver detects the transmission error, it replaces the transmission frame in accordance with a predetermined procedure (for example, refer to the abstract of JP-A-8-223126), or the like has been put into practical use.

As described above, according to the conventional error correction system of the transmission error, when the receiver detects the transmission error by using the check bit, the error correction is executed before the transmission frame is inputted to the ADPCM decoder. Therefore, since the error correction of the transmission error is executed on the basis of the predetermined error correction system at a place that is different from that of the ADPCM decoder, a problem to be solved such that its processes are complicated and hardware to execute the processes also increases remains.

SUMMARY OF THE INVENTION

It is an object of the invention to provide an ADPCM decoder with high audio quality by simple processes and a simple construction.

To accomplish the above object, the invention uses the following constructions.

According to the present invention, there is provided an ADPCM decoder, wherein an adaptive predictor which calculates the prediction signal from a quantization difference signal comprises:

bit developing means which receives the quantization difference signal separated into a mantissa part and an exponent part and bit-develops the mantissa part;

bit shifting means which bit-shifts the bit-developed mantissa part in accordance with a value of the exponent part;

overflow detecting means which is added to the most significant bit of the bit developing means and detects an overflow of the bit-shifted mantissa part; and prediction signal output means which, when the overflow detecting means detects the overflow of the mantissa part, replaces the bit-developed mantissa part with a predetermined upper limit value and outputs it as the prediction signal and, when the overflow of the mantissa part is not detected, outputs the bit-developed mantissa part as it is as a prediction signal.

in the detector of ADPCM, the prediction signal output means is a selector which receives the predetermined upper limit value from one input terminal and the bit-developed mantissa part from another input terminal, selects the predetermined upper limit value when the overflow detecting means detects the overflow, selects the bit-developed mantissa part when the overflow detecting means does not detect the overflow, and outputs the selected upper limit value or the selected mantissa part from an output terminal.

Further, according to the present invention, there is provided an ADPCM decoder, wherein an adaptive predictor which calculates the prediction signal from a quantization difference signal comprises:

bit developing means which receives the quantization difference signal separated into a mantissa part and an exponent part and bit-develops the mantissa part;

bit shifting means which bit-shifts the bit-developed mantissa part in accordance with a value of the exponent part;

overflow detecting means which is added to the most significant bit of the bit developing means and detects an overflow of the bit-shifted mantissa part; and muting processing means which, when the overflow of the mantissa part is detected, stops an output of decoding data of the ADPCM decoder.

Moreover, according to the present invention, there is provided an ADPCM decoder, wherein an adaptive predictor which calculates the prediction signal from a quantization difference signal comprises:

bit developing means which receives the quantization difference signal separated into a mantissa part and an exponent part and bit-develops the mantissa part;

bit shifting means which bit-shifts the bit-developed mantissa part in accordance with a value of the exponent part; and overflow detecting means which is added to the most significant bit of the bit developing means and detects an overflow of the bit-shifted mantissa part, and when the overflow of the mantissa part is detected, decoding data of the ADPCM decoder is outputted via a predetermined low pass filter.

The above and other objects and features of the present invention will become apparent from the following detailed description and the appended claims with reference to the accompanying drawings.

BRIEF DESCRIPTION OF THE DRAWINGS

FIG. 11 is a Table showing input/output characteristics of the adaptive quantizer.

DETAILED DESCRIPTION OF THE PREFERRED EMBODIMENTS

Embodiments of the invention will be described hereinbelow with reference to the drawings.

As described also in the prior arts mentioned above, according to the conventional error correction system of the transmission error, when the transmission error is detected, the transmission frame is corrected on the basis of the predetermined error correction system and the error-corrected transmission frame is sent to the decoder. It will be understood that error correcting means has not been provided in the decoder hitherto.

Therefore, with respect to a phenomenon which occurs when the transmission frame including the transmission error is inputted to the decoder, the inventors et al. of the present invention examined from various viewpoints, so that they have found out that when the transmission error of a degree at which the observer feels abnormality by a hearing sense is included, a partial prediction signal overflows in the decoder. On the basis of such knowledge, in the invention, the decoder side is slightly improved, so that audio quality can be further improved by simple processes and a simple construction than the case of improving the audio quality on the basis of the prior arts. The embodiments will be described hereinbelow.

Constructions and the operations of the embodiments will be described hereinbelow.

Embodiment 1

Figure 1:
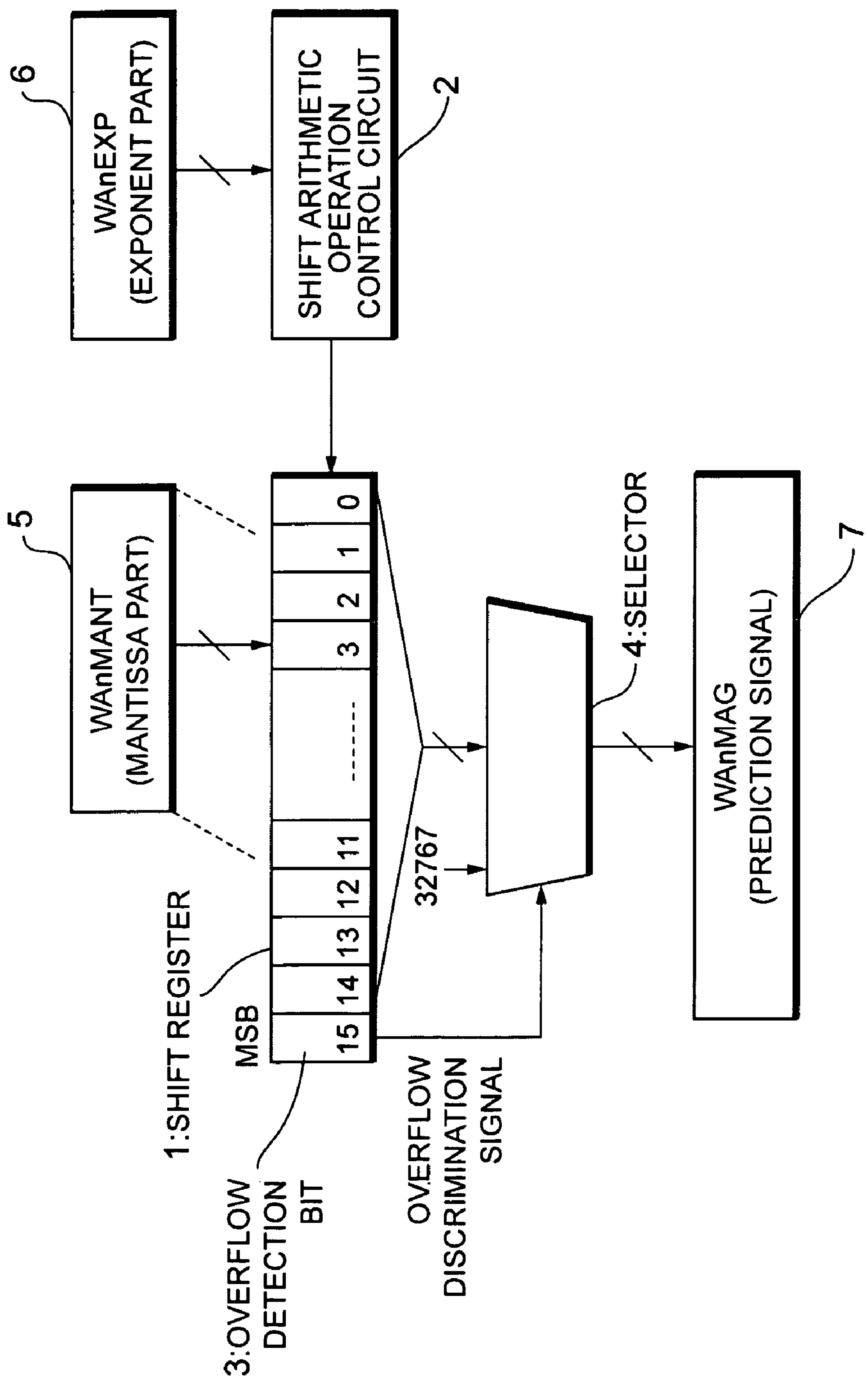
FIG. 1 is a block diagram of an adding circuit according to the embodiment 1.

FIG. 1 is a block diagram of an adding circuit according to the embodiment 1.

This diagram is a block diagram showing the adding circuit which is added to an adaptive predictor of the ADPCM decoder which conforms with the ITU-T Recommendation G.726 by the invention.

Prior to explaining details of the adding circuit, outlines of an encoder and the decoder of the ADPCM which conforms with the ITU-T Recommendation G.726 to which the adding circuit is arranged will be explained.

Figure 2:
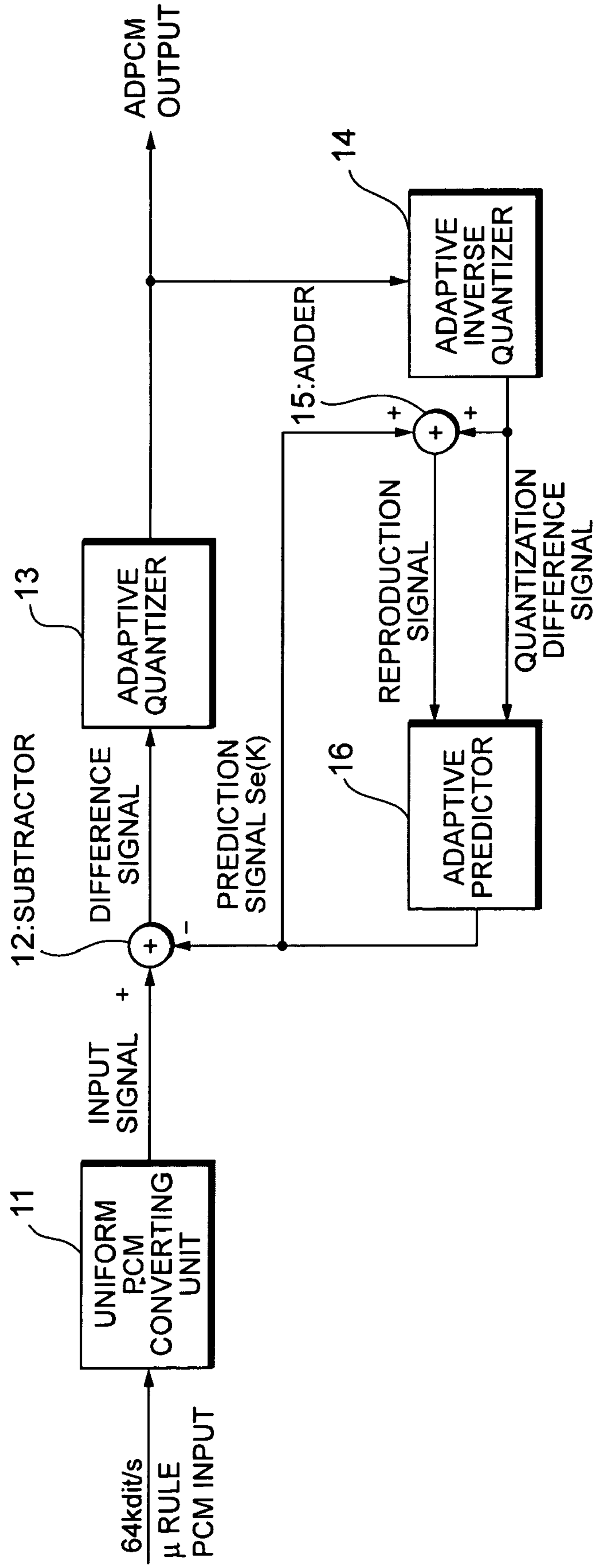
FIG. 2 is a block diagram of an ADPCM encoder which conforms with the ITU-T Recommendation G.726.

FIG. 2 is a block diagram of the ADPCM encoder which conforms with the ITU-T Recommendation G.726. (A fundamental constructional diagram of FIG. 1-1/JT-G726 of the ITU-T Recommendation G.726 is cited.)

From the diagram, the ADPCM encoder which conforms with the ITU-T Recommendation G.726 comprises: a uniform PCM converting unit 11; a subtractor 12; an adaptive quantizer 13; an adaptive inverse quantizer 14; an adder 15; and an adaptive predictor 16.

The uniform PCM converting unit 11 is a portion which receives a PCM input signal of 64 kbits/sec which was quantized by a μ rule and converts it into a uniform quantization PCM signal. The μ rule is an audio encoding standard having characteristics obtained by approximating logarithm compressing characteristics by a polygonal line and is an encoding method widely applied in Japan and North America.

The subtractor 12 is a portion for subtracting a prediction signal which is outputted from the adaptive predictor 16 from an output signal of the uniform PCM converting unit 11, that is, an input signal of the encoder. Since a correlation of levels among neighboring sampling values of an audio signal is strong, the prediction signal is a value obtained by predicting a signal that the input signal is supposed to be a signal by using the past signal. The prediction signal is formed by the adaptive predictor 16.

The adaptive quantizer 13 is a portion which receives an output of the subtractor 12, that is, a difference signal obtained by subtracting the prediction signal from the input signal and encodes it by four bits.

An output of the adaptive quantizer 13 passes through a transmission path and is sent toward the ADPCM decoder which conforms with the ITU-T Recommendation G.726.

FIG. 11 is a Table (which may be referred to herein as Table 1) showing input/output characteristics of the adaptive quantizer.

In Table 1, the input/output characteristics of the quantizer which were normalized for operation of 40 kbits/sec of Table 2-1/JT-G726 of the ITU-T Recommendation G.726 are cited.

In Table 1, a normalized input signal range 17 of the quantizer, that is, a difference signal, a value (D(k)) 18 obtained by quantizing the difference signal by 4 bits, and a value 19 obtained by inversely quantizing the quantized value (D(k)) 18 are shown. One bit showing a polarity is added to the quantized value (D(k)) 18 in Table 1. The resultant value (D(k)) 18 passes through the transmission path and is sent toward the decoder of the ADPCM which conforms with the ITU-T Recommendation G.726.

The adaptive inverse quantizer 14 is a portion which receives a part of the quantized value (D(k)) 18 and sends the inversely quantized value 19 (Table 1), that is, the quantization difference signal to the adaptive predictor 16 and the adder 15.

The adder 15 is a portion which adds the quantization difference signal and the prediction signal as an output of the adaptive predictor 16 and forms a reproduction signal.

The adaptive predictor 16 is a portion which receives the reproduction signal and the quantization difference signal, forms the prediction signal, and sends it to the subtractor 12.

As described above, the ADPCM encoder which conforms with the ITU-T Recommendation G.726 forms the prediction signal for predicting the value of the input signal on the basis of the fact that the audio signal has the strong correlation among the neighboring sampling values, obtains a difference between the input signal and the prediction signal, quantizes it, and outputs. By this method, a bit rate of quantization is reduced.

Figure 3:
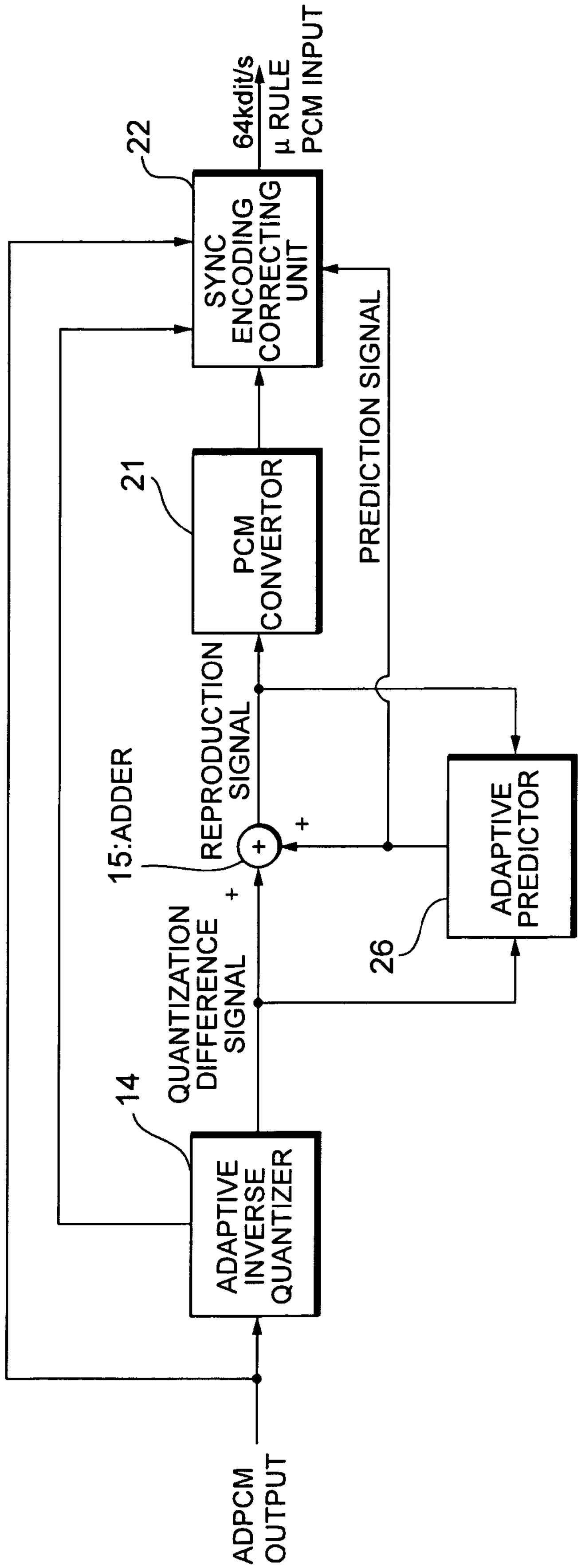
FIG. 3 is a block diagram of an ADPCM decoder which conforms with the ITU-T Recommendation G.726.

FIG. 3 is a block diagram of the ADPCM decoder which conforms with the ITU-T Recommendation G.726. (The fundamental constructional diagram of FIG. 1-1/JT-G726 of the ITU-T Recommendation G.726 is cited.)

From the diagram, the ADPCM decoder which conforms with the ITU-T Recommendation G.726 comprises: the adaptive inverse quantizer 14; the adder 15; an adaptive predictor 26; a PCM converting unit 21; and a sync encoding correcting unit 22.

As shown in the diagram, the decoder has a construction such that the PCM converting unit 21 and the sync encoding correcting unit 22 are added into a feedback loop (the subtractor 12→the adaptive quantizer 13→the adaptive inverse quantizer 14→the adder 15→the adaptive predictor 16→the subtractor 12) of the encoder mentioned above and the adaptive predictor 16 is replaced with the adaptive predictor 26 to which the adding circuit has been added by the invention.

The PCM converting unit 21 is a portion which converts the uniformly quantized PCM signal into the PCM signal quantized by the μ rule. That is, it is a portion having a function opposite to that of the uniform PCM converting unit 11 arranged in the encoder.

The sync encoding correcting unit 22 is a portion for preventing the occurrence of cumulative distortion at the time of executing tandem encoding (for example, connection by a digital signal such as ADPCM→PCM→ADPCM, or the like).

The adaptive predictor 26 has an internal construction similar to that of the adaptive predictor 16 provided for the ADPCM encoder which conforms with the ITU-T Recommendation G.726. However, since the adding circuit according to the invention is added to the adaptive predictor 26, an outline of the internal construction will be described here.

Figure 4:
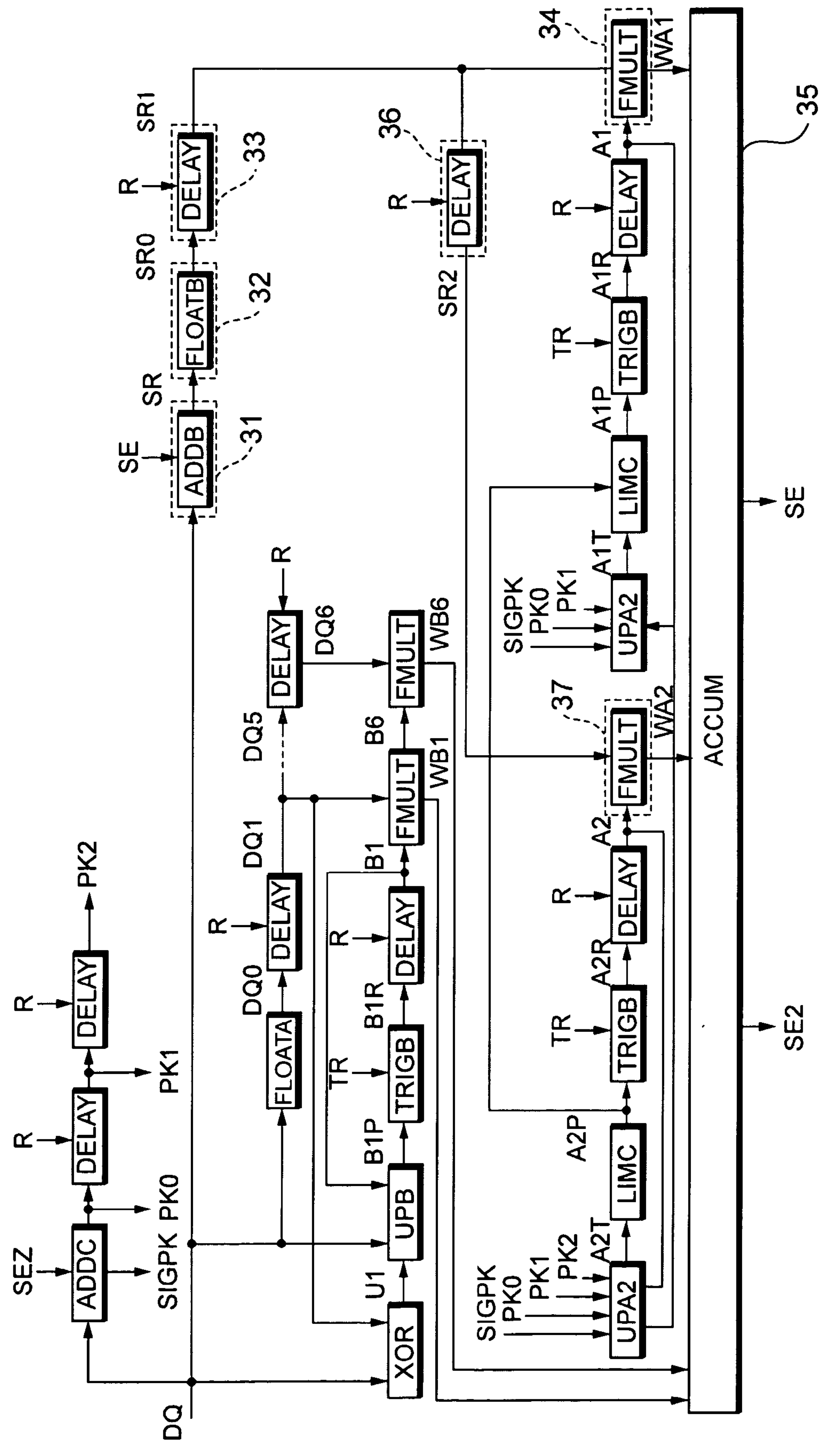
FIG. 4 is a block diagram of a construction of an adaptive predictor.

FIG. 4 is a block diagram of a construction of the adaptive predictor. (An adaptive predictor and a reproduction signal calculator of FIG. 4-6/JT-G726 of the ITU-T Recommendation G.726 are cited.)

As shown in the diagram, when the adaptive predictor receives a quantization difference signal DQ(k) (this signal corresponds to D(k) 18 in Table 1) and calculates a prediction signal SE(k), it obtains a partial prediction signal WA1, a partial prediction signal WA2, a partial prediction signal WB1, a partial prediction signal WB2, a partial prediction signal WB3, a partial prediction signal WB4, a partial prediction signal WB5, and a partial prediction signal WB6 and adds them by an ACCUM 35, thereby obtaining the prediction signal SE(k). (4.2.6. (a) ACCUM of the adaptive predictor and the reproduction signal calculator of the text of the ITU-T Recommendation G.726 is cited.)

Forming paths of the partial prediction signal WA1 and the partial prediction signal WA2 will be described as examples.

As shown in the diagram, the quantization difference signal DQ is inputted to the adaptive predictor and sent to an ADDB 31. The ADDB 31 adds the quantization difference signal DQ and the prediction signal SE (a predetermined sampling value of the prediction signal), forms a reproduction signal SR, and sends it to an FLOATB 32.

The FLOATB 32 converts the reproduction signal SR into a floating point notation. The reproduction signal SR is divided into a mantissa part MANT and an exponent part EXP, set to W·MAG=W·MANT+W·EXP, and sent as a reproduction signal SR0 to a DELAY 33.

The DELAY 33 delays the reproduction signal SR0 by a 1-clock period and sends it as a reproduction signal SR1 (W1·MAG=W1·MANT+W1·EXP) to an FMULT 34.

The FMULT 34 multiplies SR1 (W1·MAG=W1·MANT+W1·EXP) by a predictor count value A1, arithmetically operates WA1·MAG=WA1·MANT+WA1·EXP, converts it into a fixed point notation, and outputs it. A value WA1 in which WA1·MAG is expressed by the fixed point notation corresponds to the partial prediction signal WA1 in the diagram.

The predictor count value A1 is formed by a digital filter using a number of delay lines (shown by DELAY in the diagram) as shown in the diagram on the basis of the fact that the audio signal has the strong correlation among the neighboring sampling values (refer to 2.7. the adaptive predictor and the reproduction signal calculator of the text of the ITU-T Recommendation G.726 for details.)

A forming path of the partial prediction signal WA2 will be similarly explained.

Apart of the reproduction signal SR1 (W1·MAG=W1·MANT+W1·EXP) as an output of the DELAY 33 is sent to a DELAY 36.

The DELAY 36 delays the reproduction signal SR1 by a 1-clock period and sends it as a reproduction signal SR2 (W2·MAG=W2·MANT+W2·EXP) to an FMULT 37.

The FMULT 37 multiplies SR2 (W2·MAG=W2·MANT+W2·EXP) by a predictor count value A2, arithmetically operates WA2·MAG=WA2·MANT+WA2·EXP, converts it into a fixed point notation, and outputs it. A value WA2 in which WA2·MAG is expressed by the fixed point notation corresponds to the partial prediction signal WA2 in the diagram.

The predictor count value A2 is formed by a digital filter using a number of delay lines (shown by DELAY in the diagram) as shown in the diagram on the basis of the fact that the audio signal has the strong correlation among the neighboring sampling values (refer to 2.7. the adaptive predictor and the reproduction signal calculator of the text of the ITU-T Recommendation G.726 for details.)

In the above description, the adding circuit in the embodiment 1 shown in FIG. 1 is arranged to the portion where the FMULT 34 converts WA1·MAG=WA1·MANT+WA1·EXP into the fixed point notation and outputs it and the portion where the FMULT 37 converts WA2·MAG=WA2·MANT+WA2·EXP into the fixed point notation and outputs it, respectively.

Returning to FIG. 1, the adding circuit in the embodiment 1 will now be described with respect to the FMULT 34 as an example.

As shown in the diagram, the adding circuit in the embodiment 1 comprises: a shift register 1; a shift arithmetic operation control circuit 2; an overflow detection bit 3; and a selector 4.

The shift register 1 consists of 16 bits and the most significant bit (MSB) is allocated to the overflow detection bit 3. The shift register 1 is bit developing means which receives a mantissa part WA1·MANT 5 of WA1·MAG and bit-develops it. The mantissa part is expressed by 15 bits excluding the MSB.

The shift arithmetic operation control circuit 2 is bit shift means which bit-shifts the mantissa part WA1·MANT 5 developed in the shift register 1 toward the most significant bit (MSB) in accordance with a value of an exponent part WA1·EXP 6 of WA1·MAG.

The overflow detection bit 3 is overflow detecting means which detects whether the mantissa part WA1·MANT 5 developed in the shift register 1 has overflowed or not when it is bit-shifted as mentioned above.

The selector 4 is prediction signal output means which, when the overflow detection bit 3 detects the overflow, replaces the mantissa part developed in the bit developing means with a predetermined upper limit value and outputs it as a prediction signal SE and, when the overflow of the mantissa part is not detected, outputs the mantissa part developed in the bit developing means as it is as a prediction signal SE.

The operation of the adding circuit described above will be described with respect to an example on the assumption that numerical values are allocated. To clarify the effect of the adding circuit according to the invention, first, as a comparison example, an arithmetic operation is executed in accordance with (7) FMULT of 4.2.6. the adaptive predictor and the reproduction signal calculator of the text of the ITU-T Recommendation G.726.

Figure 5:
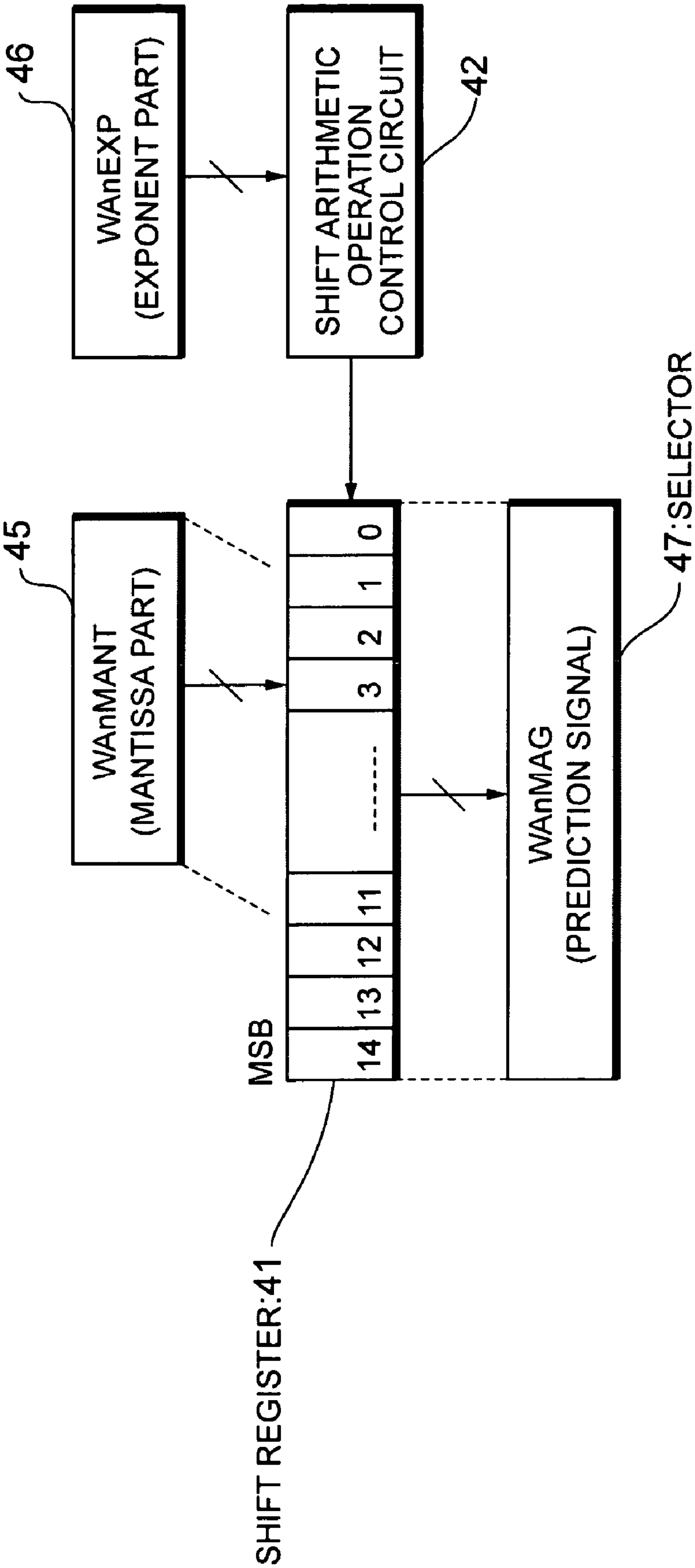
FIG. 5 is a block diagram of an adding circuit according to a comparison example.

FIG. 5 is a block diagram of an adding circuit of the comparison example.

This diagram shows the adding circuit based on the ITU-T Recommendation G.726. There are the following different points between the adding circuit of the comparison example and the adding circuit of the embodiment 1 mentioned above.

Different Point (1)

A shift register 41 consists of 15 bits and does not have the overflow detection bit in the embodiment 1 mentioned above.

Different Point (2)

The adding circuit of the comparison example does not have the selector 4 included in the adding circuit of the embodiment 1 mentioned above.

There are only the above two different points between the adding circuit of the comparison example and the adding circuit of the embodiment 1 mentioned above and all other portions are substantially the same.

Explanation will now be made as an example on the assumption that WA1·MANT=0x98 has been inputted to the shift register 41 and WA1·EXP=27 has been inputted to a shift arithmetic operation control circuit 42.

In this case, the following expressions (1) and (2) of (7) FMULT of 4.2.6. the adaptive predictor and the reproduction signal calculator of the text of the ITU-T Recommendation G.726 correspond.

$$WA1\cdot MAG=((WA1\cdot MANT<<7)<<(WA1\cdot EXP-26))\ \&\ 32767 \quad (1)$$

$$WA1\cdot EXP>26 \quad (2)$$

The following expression (3) is obtained by substituting WA1·MANT=0x98 and WA1·EXP=27 into the expression (1).

$$WA\cdot MAG=0x98<<8\ \&\ 32767 \quad (3)$$

By arithmetically operating 0x98<<8 (this means that 0x98 is shifted toward the direction of the MSB by 8 bits) in the expression (3), a bit string is expressed as "1001100000000000". However, since the shift register 41 has only 15 bits, the most significant bit 1 overflows and the bit string which is developed into the shift register 41 becomes "001100000000000".

By getting the AND of the above bit string "001100000000000" and a bit string "111111111111111" of 32767 (0x7FFF), a bit string "001100000000000" is obtained.

$$\therefore WA1\cdot MAG=6144\ (0x1800) \quad (4)$$

is obtained.

By examining the expression (4), it will be understood that since the bit string which was bit-shifted in the shift register 41 overflowed, the value 38912 of 0x98 decreases remarkably and becomes 6144 (0x1800). Thus, the prediction signal SE largely fluctuates, so that the decoding data fluctuates.

Returning to FIG. 1, explanation will be made with respect to the case where WA1·MANT=0x98 has been inputted to the shift register 1 and WA1·EXP=27 has been inputted to the shift arithmetic operation control circuit 2.

Also in this case, in a manner similar to the comparison example, the following expressions (1) and (2) of (7) FMULT of 4.2.6. the adaptive predictor and the reproduction signal calculator of the text of the ITU-T Recommendation G.726 correspond.

$$WA1\cdot MAG=((WA1\cdot MANT<<7)<<(WA1\cdot EXP-26))\ \&\ 32767 \quad (1)$$

$$WA1\cdot EXP>26 \quad (2)$$

The following expression (3) is obtained by substituting WA1·MANT=0x98 and WA1·EXP=27 into the expression (1).

$$WA1\cdot MAG=0x98<<8\ \&\ 32767 \quad (3)$$

By arithmetically operating 0x98<<8 (this means that 0x98 is shifted toward the direction of the MSB by 8 bits) in the expression (3), the bit string is expressed as "1001100000000000". However, since the overflow detection bit 3 is added to the MSB, the shift register 1 is constructed by 16 bits.

Therefore, the most significant bit 1 does not overflow but the bit string "1001100000000000" is developed as it is into the shift register 1. The most significant bit 1 becomes an overflow detection signal.

When the selector 4 receives the overflow detection signal (the most significant bit 1), it gets the AND of a bit string "001100000000000" excluding the most significant bit 1 of the above bit string and the bit string "111111111111111" of 32767 (0x7FFF), thereby obtaining the bit string "001100000000000". Since the selector 4 has received the overflow detection signal, it replaces the bit string "001100000000000" with the bit string "111111111111111" of 3276 (0x7FFF). 32767 (0x7FFF) corresponds to the upper limit value here.

By examining the above result, it will be understood that even if the MSB 1 overflowed, since the value 38912 of 0x98 is replaced with 32767 (0x7FFF), the prediction signal SE does not largely fluctuate, so that the decoding data does not fluctuate.

Although the above explanation has been made only with respect to the partial prediction signal WA1, since this is true of the other partial prediction signals, their description is omitted here.

Figure 6A:
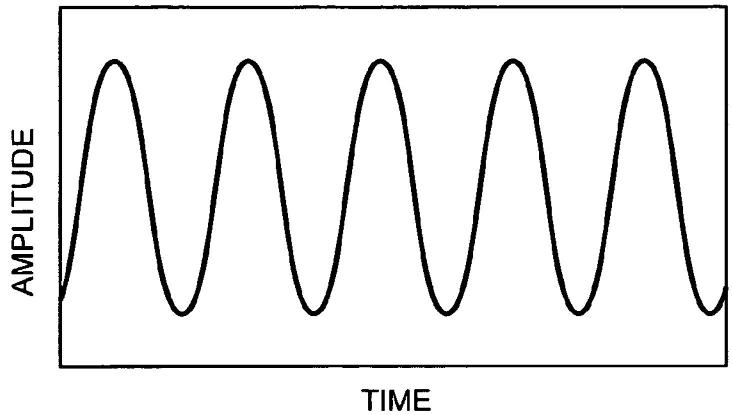
FIGS. 6A to 6C are explanatory diagrams of decoder outputs.
Figure 6B:
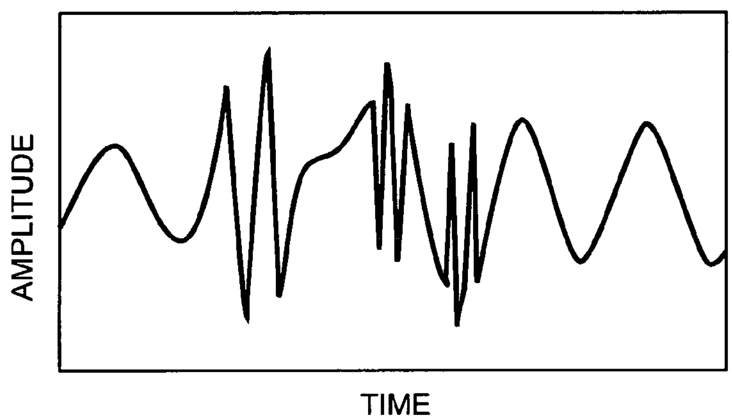
Figure 6C:
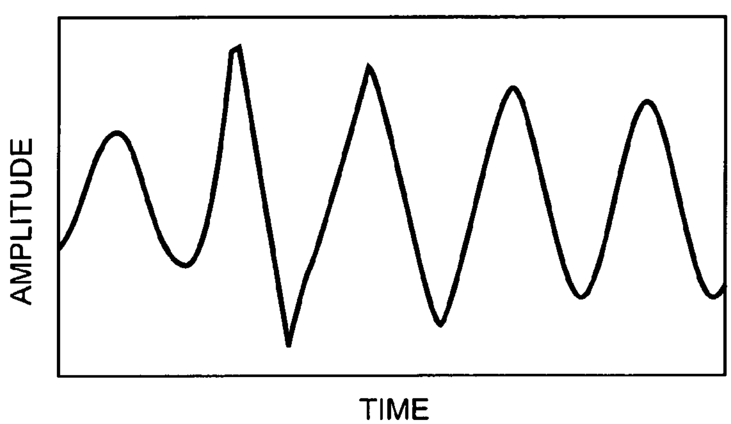

FIGS. 6A to 6C are explanatory diagrams of the decoder outputs.

FIG. 6A shows the decoder output in the case where normal data has been decoded, FIG. 6B shows the decoder output in the case where data having errors has been decoded, and FIG. 6C shows the decoder output in the embodiment 1, respectively.

As shown in the diagrams, if the data having the errors was decoded by the foregoing comparison example, a waveform fluctuates inherently as shown in FIG. 6B. However, by adding the adding circuit of the embodiment, the decoder output (FIG. 6C) almost approximated to the normal decoder output (FIG. 6A) can be obtained.

Although the number of bits of the shift register 1 has been increased by one bit and the overflow detection bit has been added in the above description, the invention is not limited to such an example. That is, it is possible to cope with such a case by keeping the number of bits of the shift register 1 to 15 bits and reducing the bit shift amount in the shift arithmetic operation control circuit by one bit. In this case, however, the least significant bit of the mantissa part is sacrificed by one bit.

Further, even if the receiver using the ADPCM decoder according to the embodiment received the transmission frame in which the check bit has been inserted on the basis of the conventional error correction system of the transmission error, the above functions are not adversely influenced. In other words, it should be noted that the above functions can be accomplished irrespective of the error correction system used in the transmitter.

Effects of the Embodiment 1

As described above, the overflow detection bit to detect the overflow of the mantissa part is added to the most significant bit of the shift register and there is provided the prediction signal output means which, when the overflow is detected, replaces the mantissa part developed in the bit developing means with the predetermined upper limit value and outputs it as a prediction signal and, when the overflow of the mantissa part is not detected, outputs the mantissa part developed in the bit developing means as it is as a prediction signal. Consequently, an effect such that the ADPCM decoder with high audio quality can be obtained by the simple processes and simple construction can be obtained.

Embodiment 2

Figure 7:
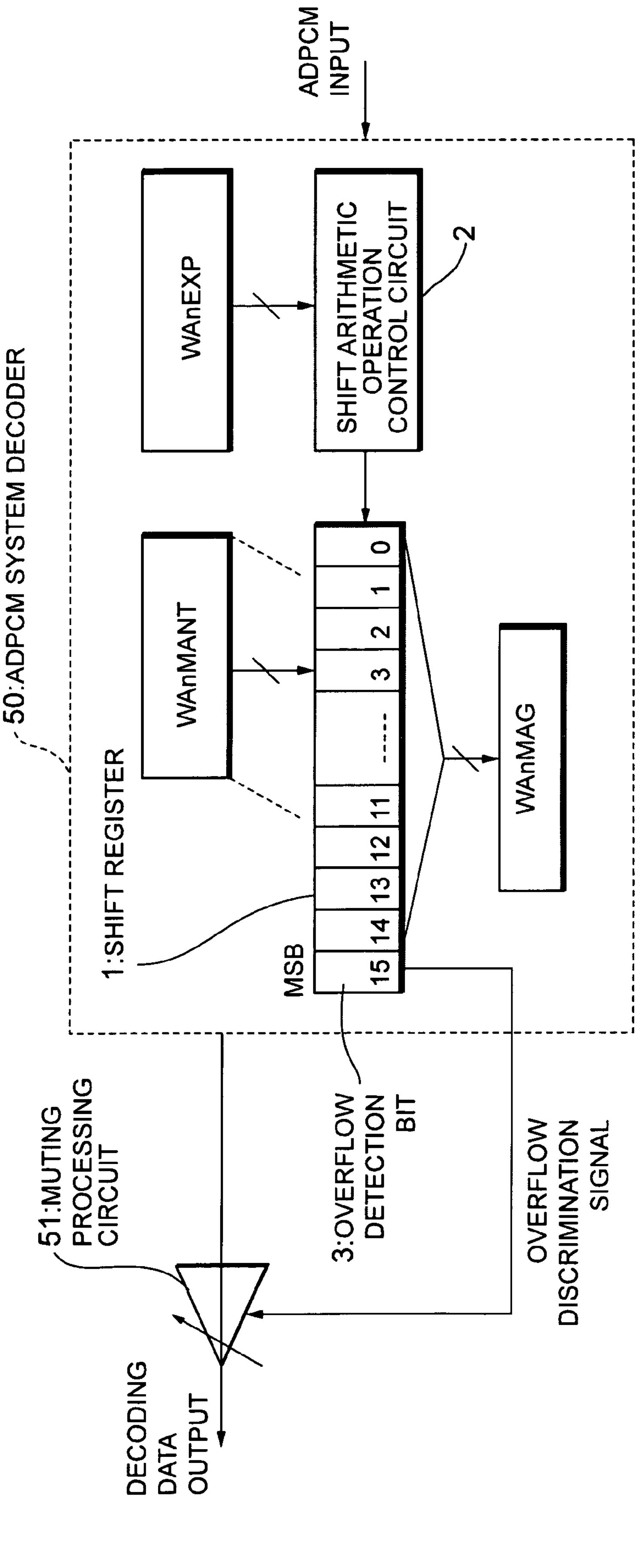
FIG. 7 is a block diagram of an adding circuit according to the embodiment 2.

FIG. 7 is a block diagram of an adding circuit according to the embodiment 2.

As shown in the diagram, the adding circuit according to the embodiment 2 comprises: the shift register 1; the shift arithmetic operation control circuit 2; the overflow detection bit 3; and a muting processing circuit 51.

The muting processing circuit 51 is muting processing means which, when the overflow detection bit 3 detects the overflow of the mantissa part, stops decoding data output of an ADPCM decoder 50.

Since other component elements are similar to those of the embodiment 1, their description is omitted.

Figure 8:
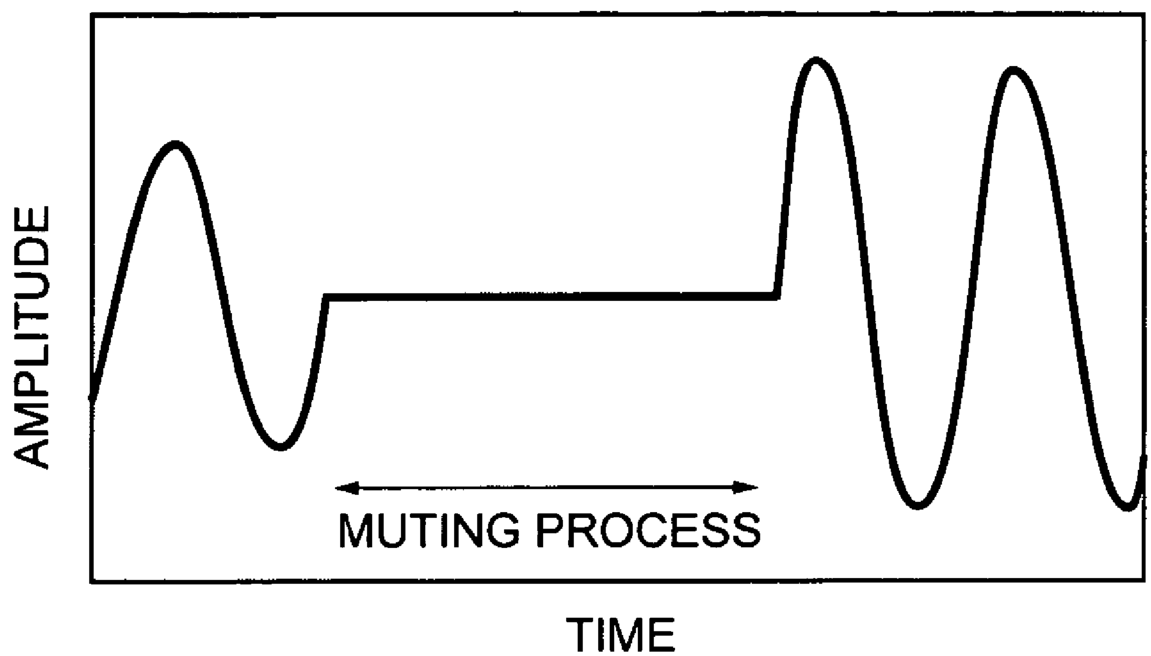
FIG. 8 is an explanatory diagram of a decoder output in the embodiment 2.

FIG. 8 is an explanatory diagram of the decoder output in the embodiment 2.

When the ADPCM decoder 50 in the embodiment 2 decodes the data having errors, the overflow detection bit 3 outputs an overflow discrimination signal in a manner similar to the embodiment 1. The overflow discrimination signal is sent to the muting processing circuit 51. At this time, the muting processing circuit 51 stops the decoding data output of the ADPCM decoder 50. Thus, the decoder output is muted and the fluctuated portion of the decoder output is not outputted as shown in the diagram.

Effects of the Embodiment 2

As described above, an effect such that since the output of the error data of a short time is stopped, the deterioration in audio quality can be suppressed to the least limit level can be obtained.

Embodiment 3

Figure 9:
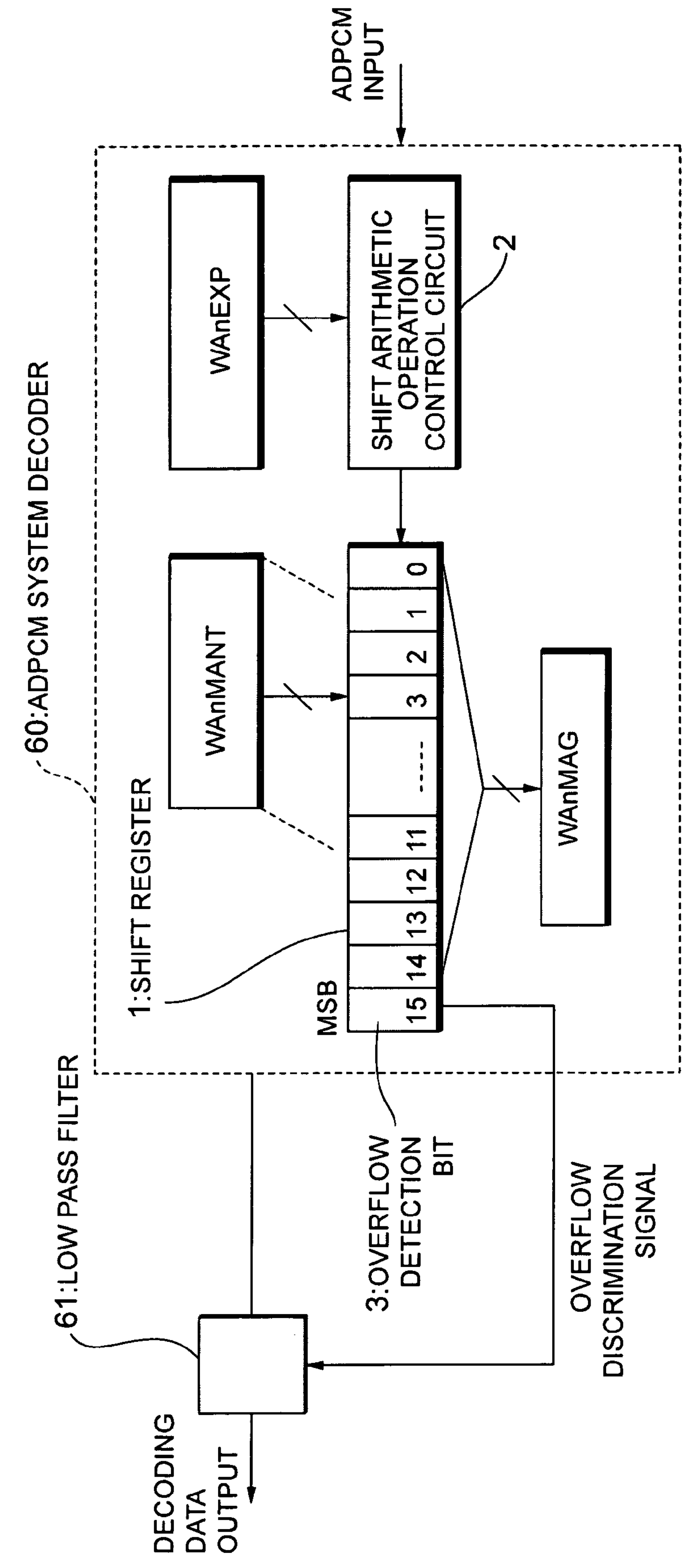
FIG. 9 is a block diagram of an adding circuit according to the embodiment 3.

FIG. 9 is a block diagram of an adding circuit according to the embodiment 3.

As shown in the diagram, the adding circuit according to the embodiment 3 comprises: the shift register 1; the shift arithmetic operation control circuit 2; the overflow detection bit 3; and a low pass filter 61.

The low pass filter 61 is a low pass filter for blocking passage of a high band component of the decoding data.

Since other component elements are similar to those of the embodiment 1, their description is omitted.

Figure 10:
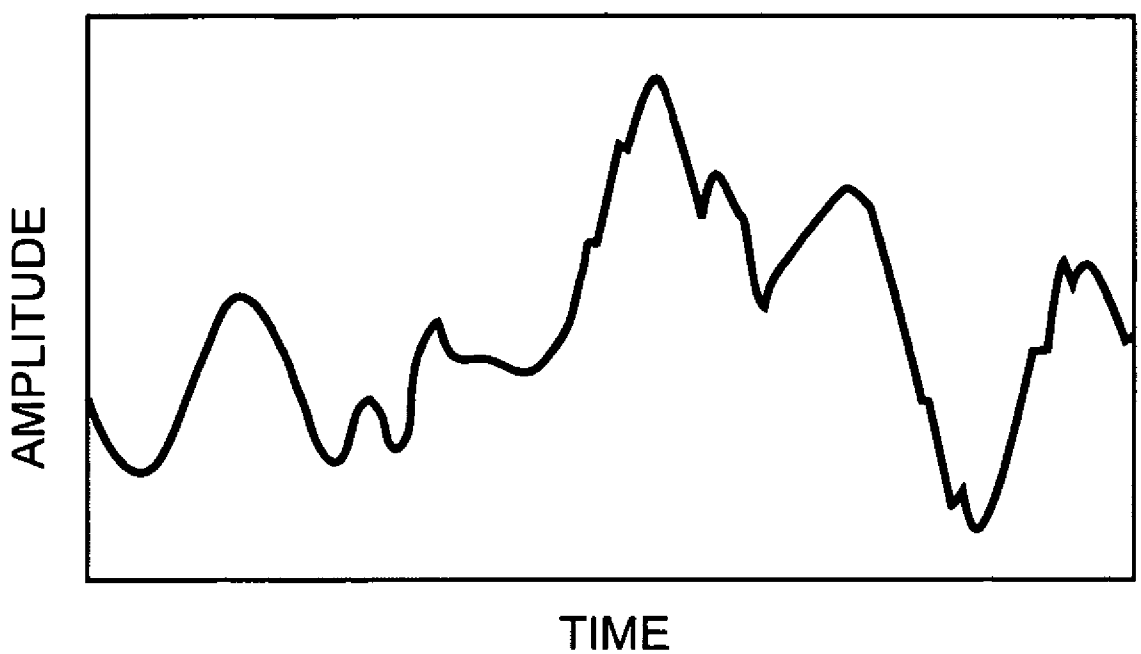
FIG. 10 is an explanatory diagram of a decoder output in the embodiment 3.

FIG. 10 is an explanatory diagram of the decoder output in the embodiment 3.

When an ADPCM decoder 60 in the embodiment 3 decodes the data having errors, the overflow detection bit 3 outputs the overflow discrimination signal in a manner similar to the embodiment 1. The overflow discrimination signal is sent to the low pass filter 61. At this time, the low pass filter 61 is connected to a decoding data output path of the ADPCM decoder 60 and blocks passage of a high band component of the decoding data. Thus, the passage of the high band component of the decoder output is blocked and the fluctuated portion of the decoder output is not outputted as shown in the diagram.

Effects of the Embodiment 3

As described above, an effect such that since the passage of the high band component of the decoder output by the error data of a short time is blocked, the deterioration in audio quality can be suppressed to the least limit level can be obtained.

The adaptive predictor which calculates the prediction signal from the quantization difference signal comprises: the bit developing means which receives the quantization difference signal separated into the mantissa part and the exponent part and bit-develops the mantissa part; the bit shifting means which bit-shifts the mantissa part developed in the bit developing means in accordance with the value of the exponent part; and the overflow detecting means which is added to the most significant bit of the bit developing means and detects the overflow of the bit-shifted mantissa part. When the overflow of the mantissa part is detected, the mantissa part developed in the bit developing means is replaced with the predetermined upper limit value and outputted as a prediction signal. Thus, an effect such that the audio quality can be further improved by the simple processes and simple construction than the case of improving the audio quality on the basis of the conventional error correction system.

The present invention is not limited to the foregoing embodiments but many modifications and variations are possible within the spirit and scope of the appended claims of the invention.

What is claimed is:

1. An ADPCM decoder, comprising:

an adaptive predictor which calculates a prediction signal from a quantization difference signal, the quantization difference signal including a mantissa part and an exponent part, the adaptive predictor including bit developing means which receives said mantissa part, and which bit-develops said mantissa part, bit shifting means which bit-shifts said bit-developed mantissa part in accordance with a value of said exponent part, overflow detecting means which is disposed as a most significant bit of said bit developing means and detects an overflow of said bit-shifted mantissa part, and prediction signal output means which, when said overflow detecting means detects the overflow of said bit-shifted mantissa part, replaces said bit-shifted mantissa part with a predetermined upper limit value and outputs said predetermined upper limit value as said prediction signal, and when the overflow of said bit-shifted mantissa part is not detected, outputs said bit-shifted mantissa part as said prediction signal; and an adder which adds said prediction signal and said quantization difference signal to provide a reproduction signal that corresponds to a decoded signal.

2. The decoder according to claim 1, wherein said prediction signal output means is a selector which receives said predetermined upper limit value at one input terminal and said bit-shifted mantissa part at another input terminal, selects said predetermined upper limit value when said overflow detecting means detects the overflow, selects said bit-shifted mantissa part when said overflow detecting means does not detect the overflow, and outputs the selected predetermined upper limit value or the selected bit-shifted mantissa part from an output terminal.

3. An ADPCM decoder, comprising:

an adaptive predictor which calculates a prediction signal from a quantization difference signal, the quantization difference signal including a mantissa part and an exponent part, the adaptive predictor including bit developing means which receives said mantissa part, and which bit-develops said mantissa part, bit shifting means which bit-shifts said bit-developed mantissa part in accordance with a value of said exponent part, and overflow detecting means which is disposed as a most significant bit of said bit developing means and detects an overflow of said bit-shifted mantissa part; and muting processing means which, when the overflow of said bit-shifted mantissa part is detected, stops an output of decoding data of said ADPCM decoder.

4. An ADPCM decoder, comprising:

an adaptive predictor which calculates a prediction signal from a quantization difference signal, the quantization difference signal including a mantissa part and an exponent part, the adaptive predictor including bit developing means which receives said mantissa part, and which bit-develops said mantissa part, bit shifting means which bit-shifts said bit-developed mantissa part in accordance with a value of said exponent part, and overflow detecting means which is disposed as a most significant bit of said bit developing means and detects an overflow of said bit-shifted mantissa part; and a low pass filter outputting decoding data of said ADPCM decoder when the overflow of said bit-shifted mantissa part is detected.

* * * * *